March 18, 1969 L. M. LATTA 3,433,211
COOKING APPARATUS
Filed April 25, 1967 Sheet 1 of 2
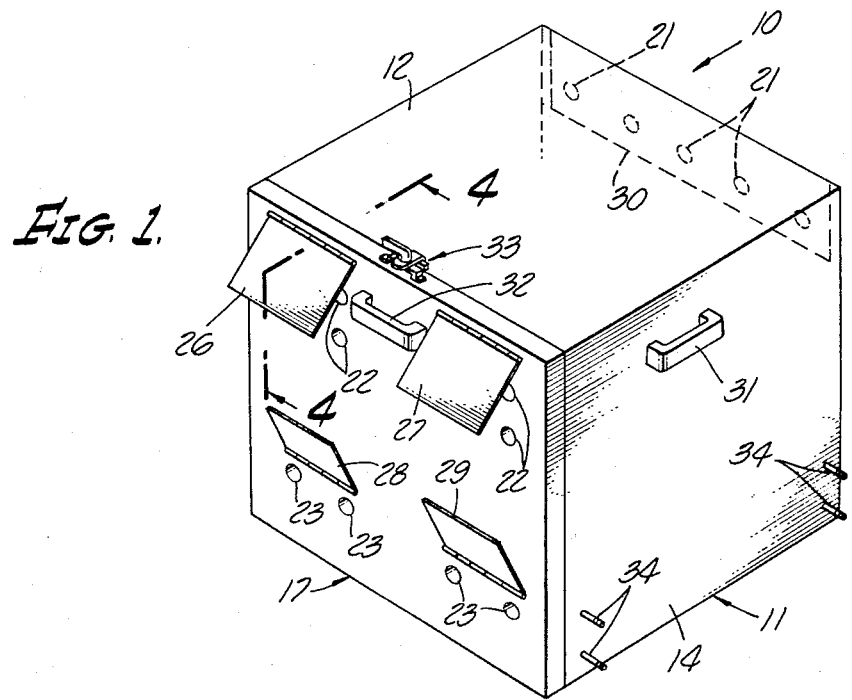
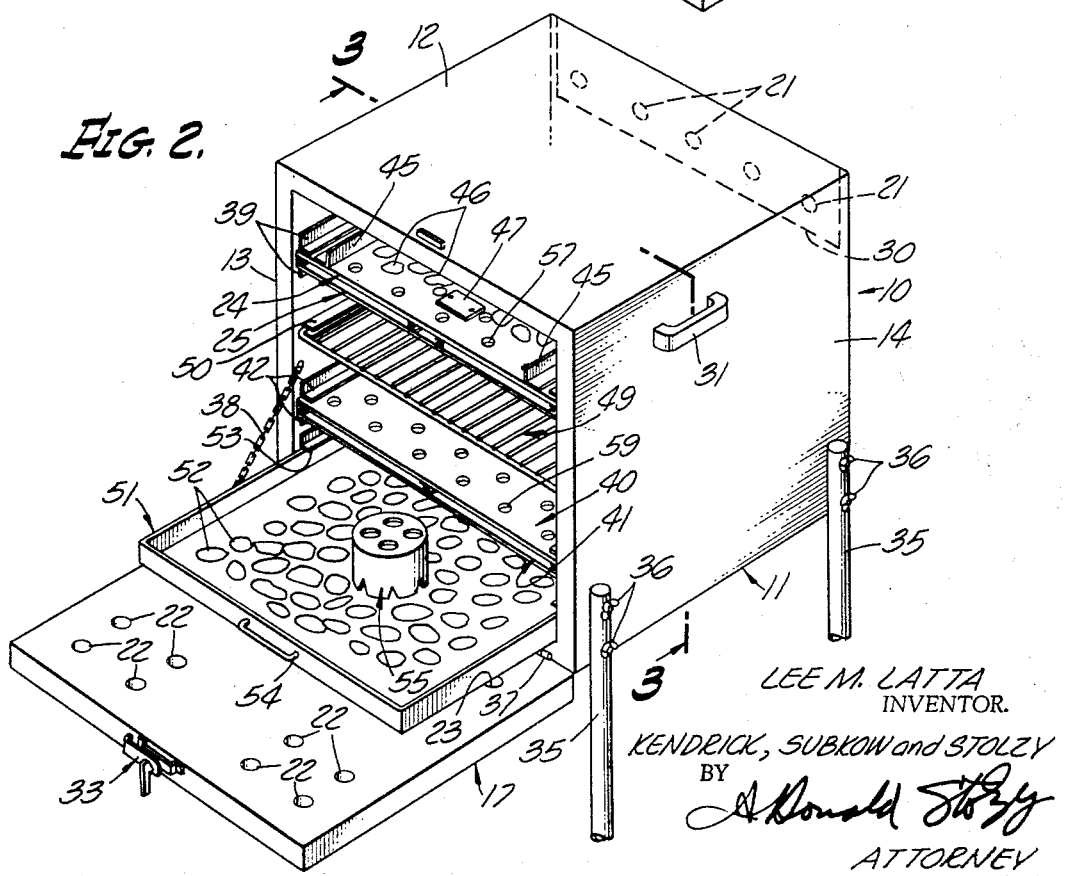
LEE M. LATTA
INVENTOR.
KENDRICK, SUBKOW and STOLZY
BY
A. Donald Stolzy
ATTORNEY

LEE M. LATTA
INVENTOR.

KENDRICK, SUBKOW and STOLZY
BY

ATTORNEYS

United States Patent Office 3,433,211
Patented Mar. 18, 1969

3,433,211
COOKING APPARATUS
Lee M. Latta, 3984 S. Normandie Ave.,
Los Angeles, Calif. 90037
Filed Apr. 25, 1967, Ser. No. 633,451
U.S. Cl. 126—25    12 Claims
Int. Cl. F24b 3/00; A47j 37/01, 37/07

ABSTRACT OF THE DISCLOSURE

An oven or the like having a grill and a pair of asbestos plates both above and below the grill. Both pairs of plates have offset holes therein. That is, one plate has holes therethrough which are out of alignment with the holes in the other plate. Charcoal is placed on top of the upper pair of plates and below the lower pair of plates. Uniform heat is thus produced around food or meat products on the grill. The asbestos plates are made of a composition of cementitious material or the like which have a rather high specific heat. The offset holes in the upper plates prevent charcoal ashes from dropping on the food. The offset holes in the lower plates prevent meat drippings or the like from dropping onto the charcoal below the lower plates.

BACKGROUND OF THE INVENTION

This invention relates to devices for cooking foods, and more particularly to means for barbecuing meat or the like.

In the past, it has been the practice to enclose partially the fire pan of a charcoal broiler to smoke as well as to cook meat. However, in such broilers, all the heat is supplied at only one location below the meat. Such broilers thus do not effectively sear the meat and seal in the natural juices.

SUMMARY OF THE INVENTION

In accordance with the device of the present invention, the above-described and other disadvantages of the prior art are overcome by providing means to hold a hot bed of charcoal both above and below the meat. The air surrounding the meat is therefore kept at a high, uniform temperature.

It is also another feature of the present invention that two sets of plates are employed to separate the charcoal from the meat. Each set of plates contains two plates. A plurality of spaced holes are provided through each plate. The spaced holes in one plate are offset and located out of alignment with the spaced holes of the other plate of the same set. Each set of plates may be substantially identical. In accordance with the invention, a hot bed of charcoal is placed on top of an upper set of the plates. The offset holes through the plates allow hot air to flow downwardly through the holes around the meat. However, the offset character of the holes prevents ashes from the charcoal from dropping down onto the meat.

The lower set of plates allows hot air to flow upwardly through the holes. However, the offset character of the holes in the lower plates prevent grease drippings or the like from falling through the holes onto a lower hot bed of charcoal below the lower plates.

In accordance with another feature of the present invention, the plates are made of asbestos strengthened by a cementitious material.

The above-described and other advantages of the present invention will be better understood from the following description when considered in connection with the accompanying drawings.

BRIEF DESCRIPTION OF THE DRAWINGS

In the drawings which are to be regarded as merely illustrative:

FIG. 1 is a perspective view of cooking apparatus constructed in accordance with the present invention;

FIG. 2 is a perspective view of the apparatus with the apparatus door open;

DESCRIPTION OF THE PREFERRED EMBODIMENT

Figure 3:
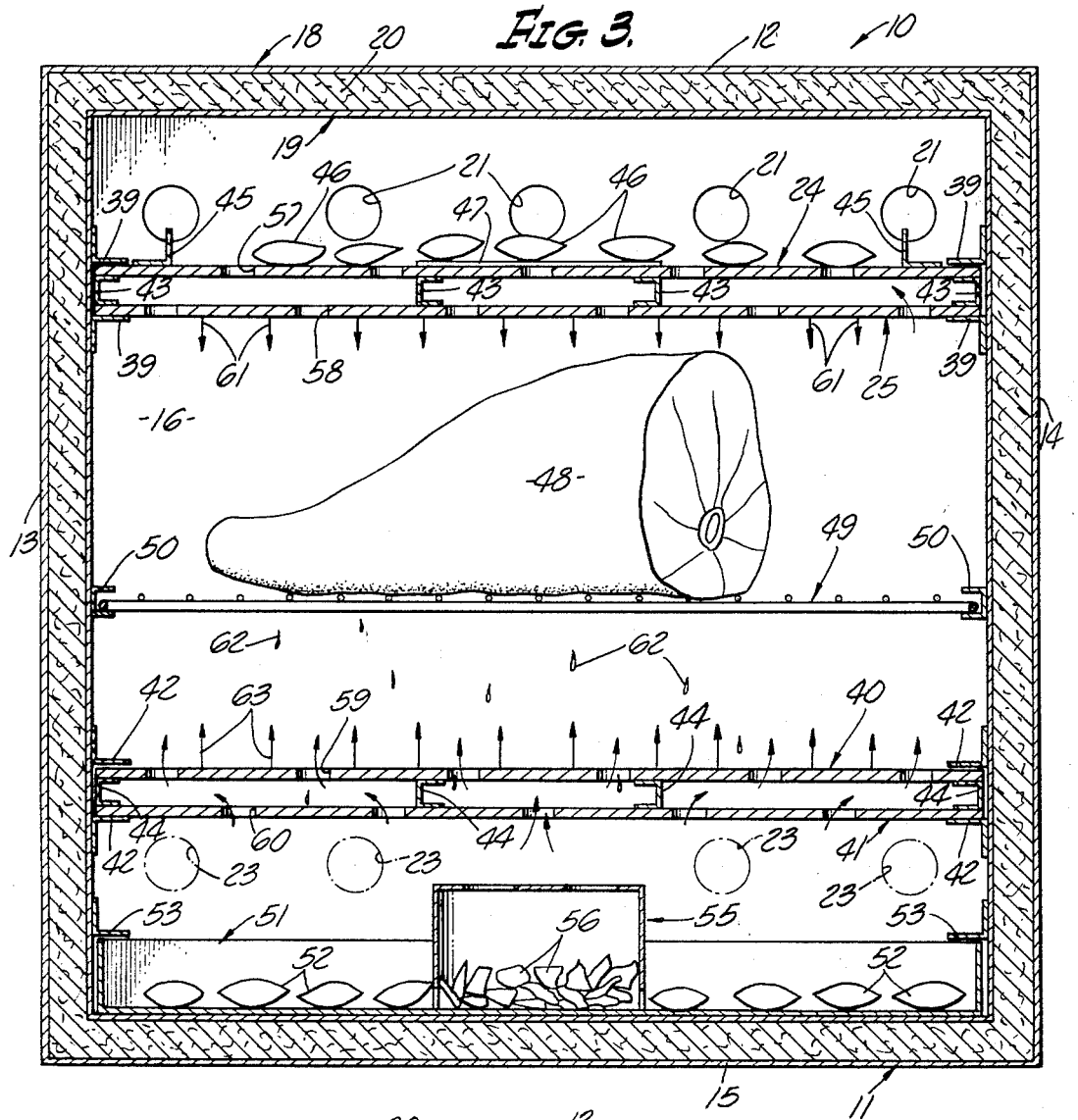
FIG. 3 is a vertical sectional view through the apparatus taken on the line 3—3 shown in FIG. 2.
Figure 4:
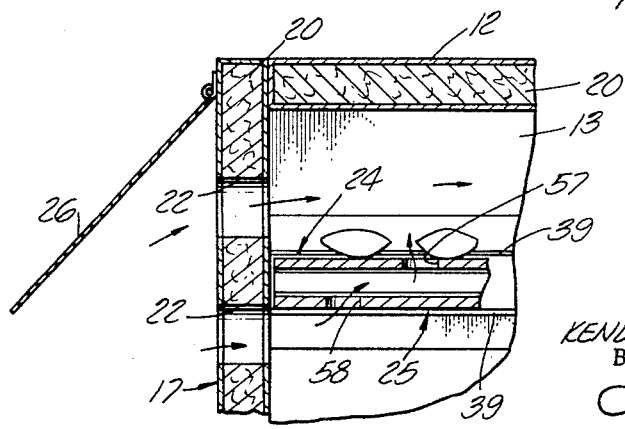
FIG. 4 is a sectional view of a portion of the apparatus taken on the line 4—4 shown in FIG. 1.

In the drawing in FIG. 1, the apparatus of the invention is indicated generally at 10. Apparatus 10 includes a housing 11. Housing 11 has a top wall 12, side walls 13 and 14, a bottom wall 15, and a rear wall 16, as shown in FIG. 3. Housing 11 also has a front side wall 17 which acts as a door as shown in FIG. 1.

As shown in FIG. 3, housing 11 has an outside shell 18 and an inside shell 19. Housing 11 also has a fiberglass insulation 20 between shells 18 and 19. Door 17 is similarly constructed.

Rear wall 16 has circular ventilation openings 21 therethrough. Door 17 has upper circular openings 22 therethrough. Door 17 also has lower circular openings 23 therethrough. Note will be taken that rear wall openings 21 are positioned between a first plate 24 inside housing 11 and top wall 12. Openings 22 are positioned on opposite sides of plates 24 and 25. Covers are provided at 26 and 27 for holes 22 as shown in FIG. 1. Covers 28 and 29 are provided for holes 23. Covers 26, 27, 28 and 29 may be hinged to door 17 by conventional means. The hinge pin of each cover may be press fit in the hinge so that each cover may be located at any particular angle relative to the front surface of door 17, if desired. A cover 30 is provided for holes 21 as shown in FIG. 1. Cover 30 may be identical to covers 26, 27, 28 and 29, except for its length.

A conventional carrying handle is provided at 31 and fixed to housing side wall 14. An identical handle may be fixed to side wall 13, not shown. Door 17 has a handle 32 identical to handle 31. Door 17 is fixed in the position shown in FIG. 1 by conventional lock means 33.

Housing 11 has bolts at 34. Legs indicated at 35 and shown in FIG. 2 may be fixed to housing 11 around bolts 34 by wing nuts 37.

As shown in FIG. 2, door 17 is hinged to bottom wall 15 at 37. A chain 38 is provided for door 17. Chain 38 is fixed to door 17 and to side wall 13 to hold door 17 in the horizontal position of FIG. 2.

As shown in FIG. 3, plates 24 and 25 are slidable between angle irons 39 fixed to side walls 13 and 14 of housing 11. Similarly, plates 40 and 41 are slidable between angle irons 42 fixed to housing 11. Plates 24 and 25 are fixed relative to each other by channels 43. Similarly, plates 40 and 41 are fixed relative to each other by channels 44. Angle irons 45 are fixed to plate 24 to guide its outward movement and hold charcoal at 46 on top thereof. Two plates 47, only one of which is shown in FIGS. 2 and 3, may be fixed to the top of plate 24 and bolted through channels 43 and plate 25 to strengthen plates 24 and 25. Meat at 48 is carried by a conventional grill 49 slidable in channels 50 fixed to housing 11. A tray 51 carries charcoal at 52. Movement of tray 51 outwardly of housing 11 as shown in FIG. 2 is guided by angle irons 53 fixed to housing 11. Tray 51 has a handle at 54 as shown in FIG. 2.

A smoker is indicated at 55 in FIGS. 2 and 3. Smoker 55 carries wooden chips 56 of hickory.

Plates 24, 25, 40 and 41 are made of asbestos strengthened by a cemetitious material. The material of plates 24, 25, 40 and 41 may be conventional.

In the operation of the cooking apparatus 10, charcoal at 46 and 52 is lit. Oxygen from the air is then supplied to charcoal 52 through door openings 23. Oxygen is supplied to charcoal 46 through openings 22. The circulation of air is facilitated in an inward direction through openings 22 and 23 and in an outward direction through openings 21. Note will be taken that plates 24, 25, 40 and 41 have holes at 57, 58, 59 and 60, respectively. Holes 57 are offset horizontally from holes 58. Holes 59 are offset horizontally from holes 60. Holes 57 and 58 allow hot air and smoke from charcoal 46 to pass downwardly over meat 48. Plates 24 and 25 also radiate heat downwardly in the direction of arrows 61. The offset character of holes 57 and 58 prevent the ashes of charcoal 46 from falling down onto meat 48.

Holes 59 and 60 allow hot air to flow upwardly therethrough around meat 48. The offset character of holes 59 and 60 also prevent grease drippings at 62 from reaching charcoal 52.

In accordance with the foregoing, it will be appreciated that heat and hot air is supplied to meat 48 completely therearound to provide an even cooking heat. Heat radiates from plates 24 and 25 in the direction of arrow 61 as stated previously. Heat also radiates from plates 40 and 41 in the direction of arrows as shown in FIG. 3. The natural juices of meat 48 are thus sealed in. The mineral character of cementitious and fiber material of the plates 24, 25, 40 and 41 cause the plates to retain considerable heat which may be radiated evenly and uniformly around meat 48.

The rough and absorbent character of the plates prevent the grease drippings 62 from burning or flaring up, as would be the case if metal were used for the plates.

At the same time meat 48 is cooked, the meat will also take on a charcoal broiled flavor due to smoke from charcoal 46 and 52 passing through the plates.

Meat 48 is also smoked by the smoke arising from wooden chips 56 through holes 59 and 60 of plates 40 and 41, respectively.

Note will be taken that the plates may be used in more than one type of cooking apparatus. If desired, three sets of plates may be employed in one housing, one over the other. As before, each set of plates may include two plates. Food could thus be cooked between adjacent pairs of plates at two elevations in the housing.

Although insulation 20 helps retain the heat produced by charcoal 46 and 52, insulation 20 may be omitted, if desired.

Although the invention has been described as useful in connection with barbecuing meat, the cooking apparatus 10 of the present invention may be employed to fry or bake the same or other foods.

Although only one specific embodiment of the present invention has been described and illustrated herein, many changes and modifications thereof will of course suggest themselves to those skilled in the art. The present invention should therefore not be limited to the embodiment selected for this disclosure, the true scope of the invention being defined only in the appended claims.

I claim:

1. A device to cook foods, said device comprising: a housing to provide an enclosure, said housing having side walls and spaced top and bottom walls, said housing also having ventilation openings therethrough; and first, second, third and fourth plates fixed in substantially horizontal positions in said housing, said first plate being located below said second plate, said third plate being located below said second plate a substantial distance therefrom to permit food to be placed inside said housing between said second and third plates, said fourth plate being located below said third plate, said fourth plate being spaced a distance from said housing bottom wall to permit a lower hot bed of charcoal to be placed therebetween, said first plate being spaced a distance from said top wall to permit an upper hot bed of charcoal to be placed therebetween, all of said plates having spaced holes therethrough, all of the holes in said first plate being spaced so as to be offset and out of alignment with the holes in said second plate, said first plate holes being offset from said second plate holes a distance sufficient to prevent the ashes of the charcoal above said first plate from falling through said first plate holes onto the food, the holes in said first and second plates nevertheless permitting hot air to circulate downwardly therethrough to cook the food, said third plate holes also being spaced so as to be offset and out of alignment with said fourth plate holes, said third plate holes being offset from said fourth plate holes a distance sufficient to prevent meat grease drippings or other food products from falling through said third plate holes onto said lower bed of charcoal, the holes in said third and fourth plates nevertheless allowing hot air to circulate upwardly therethrough to cook the food.

2. The invention as defined in claim 1, wherein said ventilation openings are provided through at least one side wall between said bottom wall and said fourth plate, said ventilation openings also being provided through two opposite side walls between said first plate and said top wall.

3. The invention as defined in claim 2, wherein said housing includes means to close enough of said openings to stop said charcoal from burning.

4. The invention as defined in claim 2, wherein said plates are made of asbestos.

5. The invention as defined in claim 3, wherein said plates are made of asbestos.

6. A device to cook foods, said device comprising: a housing to provide an enclosure, said housing having side walls and spaced top and bottom walls, said housing also having ventilation openings therethrough; first, second, third and fourth plates fixed in substantially horizontal positions in said housing, said first plate being located over said second plate, said third plate being located below said second plate a substantial distance therefrom to permit food to be placed inside said housing between said second and third plates, said fourth plate being located below said third plate, said fourth plate being spaced a distance from said housing bottom wall to permit a lower hot bed of charcoal to be placed therebetween, said first plate being spaced a distance from said top wall to permit an upper hot bed of charcoal to be placed therebetween, all of said plates having spaced holes therethrough, all of the holes in said first plate being spaced so as to be offset and out of alignment with the holes in said second plate, said first plate holes being offset from said second plate holes a distance sufficient to prevent the ashes of the charcoal above said first plate from falling through said first plate holes onto the food, the holes in said first and second plates nevertheless permitting hot air to circulate downwardly therethrough to cook the food, said third plate holes also being spaced so as to be offset and out of alignment with said fourth plate holes, said third plate holes being offset from said fourth plate holes a distance sufficient to prevent meat grease drippings or other food products from falling through said third plate holes onto said lower bed of charcoal, the holes in said third and fourth plates nevertheless allowing hot air to circulate upwardly therethrough to cook the food; and a support for food, said support being fixed in said housing in a substantially horizontal position betwen and spaced from both of said second and third plates.

7. The invention as defined in claim 4, wherein said support is a grill.

8. The invention as defined in claim 7, wherein said plates are made of asbestos.

9. The invention as defined in claim 6, wherein said plates are made of asbestos.

10. A device to cook foods, said device comprising: a housing to provide an enclosure, said housing having side walls and spaced top and bottom walls, said housing also having ventilation openings therethrough; first, second, third and fourth plates fixed in substantially horizontal positions in said housing, said first plate being located over said second plate, said third plate being located below said second plate a substantial distance therefrom to permit food to be placed inside said housing between said second and third plates, said fourth plate being located below said third plate, said fourth plate being spaced a distance from said housing bottom wall to permit a lower hot bed of charcoal to be placed therebetween, said first plate being spaced a distance from said top wall to permit an upper hot bed of charcoal to be placed therebetween, all of said plates having spaced holes therethrough, all of the holes in said first plate being spaced so as to be offset and out of alignment with the holes in said second plate, said first plate holes being offset from said second plate holes a distance sufficient to prevent the ashes of the charcoal above said first plate from falling through said first plate holes onto the food, the holes in said first and second plates nevertheless permitting hot air to circulate downwardly therethrough to cook the food, said third plate holes also being spaced so as to be offset and out of alignment with said fourth plate holes, said third plate holes being offset from said fourth plate holes a distance sufficient to prevent meat grease drippings or other food products from falling through said third plate holes onto said lower bed of charcoal, the holes in said third and fourth plates nevertheless allowing hot air to circulate upwardly therethrough to cook the food; one of said side walls including a door; and a charcoal tray slidable in between said fourth plate and said bottom wall, said tray being slidable outwardly of said housing when said door is open.

11. The invention as defined in claim 10, wherein said plates are made of asbestos.

12. The invention as defined in claim 1, wherein said plates are made of asbestos.

References Cited

UNITED STATES PATENTS

| 1,505,273 | 8/1924 | Maul | 126—91 X |
| 995,705 | 6/1911 | Neel | 126—9 |
| 2,573,719 | 11/1951 | Lebhere | 126—275 X |
| 2,940,381 | 6/1960 | Cottongim et al. | 126—25 X |

FREDERICK L. MATTESON, JR., *Primary Examiner.*

E. G. FAVORS, *Assistant Examiner.*